Jan. 24, 1961  R. Y. MINER  2,969,539
PROXIMITY WARNING AND COLLISION AVOIDANCE SYSTEM
Filed March 28, 1958  2 Sheets-Sheet 1

INVENTOR.
RICHARD Y. MINER
BY
Raymond A. Paquin
ATTORNEY.

INVENTOR.
RICHARD Y. MINER
BY Raymond A. Paquin
ATTORNEY.

United States Patent Office 2,969,539
Patented Jan. 24, 1961

2,969,539

PROXIMITY WARNING AND COLLISION AVOIDANCE SYSTEM

Richard Y. Miner, Port Washington, N.Y., assignor to American Bosch Arma Corporation, a corporation of New York Filed Mar. 28, 1958, Ser. No. 724,570

7 Claims. (Cl. 343—112)

The present invention relates to aircraft collision prevention systems and has particular reference to proximity warning devices.

Aircraft proximity indicators have received considerable attention as an aid in reducing mid-air collisions. The proximity indicator is intended to alert the pilot whenever collision with another aircraft is likely, so that the pilot may take evasive action to prevent the collision. Many systems, such as those in which positional information is telemetered between aircraft or where penetration of intruding aircraft within selected boundaries of altitude or range actuates an alarm, may give warning even though the danger of collision is not real. The present invention can be used alone or in conjunction with other proximity warning systems to reduce the number of false warnings and to increase the effectiveness of the warning system.

In accordance with the present invention, the closure time, i.e., time to go to minimum range or collision, is determined preferably by operating on a signal received by own aircraft and emanating from the intruding aircraft. When closure time reaches a dangerous value, the bearing change is monitored and, if the rate of change of bearing is within predetermined limits, the warning alarm is actuated.

The closure time is determined by a computing device which accomplishes a differentiation with respect to time of the natural logarithm of the strength of the received signal, which rate of change is equal to the reciprocal of the closure time. For purposes of this invention, it is assumed that the automatic volume control signal is sufficiently close to the logarithm of the received signal, so that a portion of the computer can be simplified. However, if A.V.C. is not available, other means for obtaining the natural logarithm of the received signal may be employed.

For a more complete understanding of this invention, reference may be had to the accompanying diagrams, in which.

Figure 1:
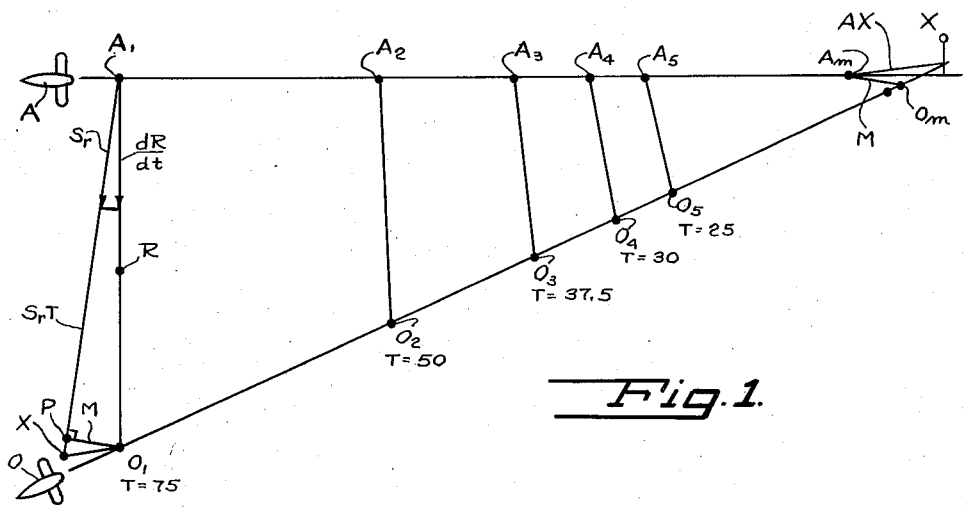
Fig. 1 shows the trigonometry of a typical state of circumstances which may lead to collision of two aircraft.

With reference to Fig. 1 of the drawings, the situation existing when two aircraft are in potential danger of collision is illustrated. One aircraft A, the dangerous aircraft, is proceeding along a course defined by the successive positions $A_1, A_2, A_3 \ldots A_m$ while a second aircraft, own aircraft, is proceeding along a course defined by the successive positions $O_1, O_2, O_3 \ldots O_m$ which occur at the same time as the similarly indexed positions of the aircraft A.

The aircraft A and O will reach a position of minimum separation, or miss distance M, at the position $A_m$ and $O_m$. If the separation is considerable, safe passage occurs. This may also be seen by constructing a relative motion triangle $A_1O_1X$ where $O_1X$ is parallel to $O_xA_x$, and $O_x$ and $A_x$ are the positions of O and A at any instant. For Fig. 1 the time of $O_x$ and $A_x$ has been chosen as greater than the time required to reach minimum distance in the interest of clarity, although any of the intermediate positions 1, 2, 3 etc. could be used for the construction. The miss distance, M, is then the shortest distance between $O_1$ and $A_1X$, i.e., the perpendicular from $O_1$ to P on line $A_1X$.

It is known that if the bearing rate of the two aircraft is zero while range is decreasing, a collision will occur. If the range is decreasing and the time "to-go-to-collision" or the closure time is known, the pilot can be warned in time to take evasive action when the bearing rate is such that a collision can be expected. This is the premise on which the operation of this invention is based.

Figure 2:
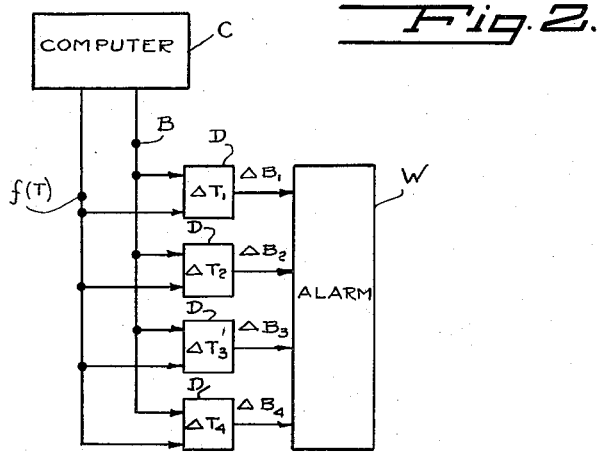
Fig. 2 illustrates, in block form, the basic elements of this invention.

Fig. 2 schematically illustrates the basis of the present invention. A computer C develops one signal proportional to a function of the closure time $f(T)$, and a second signal proportional to the relative bearing B of aircraft A with respect to aircraft O, where the aircraft O is regarded as own aircraft and aircraft A is considered to be the dangerous aircraft.

The closure time signal and the bearing signal are both applied to devices D which determine the change in relative bearing during closure time intervals $\Delta T_1, \Delta T_2, \Delta T_3$ and $\Delta T_4$ starting at preselected instants of closure time $T_1, T_2, T_3$ etc. The corresponding bearing changes $\Delta B_1, \Delta B_2, \Delta B_3$ and $\Delta B_4$ are connected to the alarm device which is actuated whenever the $\Delta B$ value in any interval falls below a certain amount, for example 2°.

Prior methods of determining closure time have depended upon knowledge of present range and relative speed. The preferred embodiment of the present invention, however, determines closure time without definite knowledge of actual closure rate, range or relative speed from the rate of change of the natural logarithm of voltage received, assuming a constant energy radiating source, to predict closure time. Thus, the relationship used here is $$\frac{1}{T} = \frac{d}{dt} \log_e E \qquad (1)$$

where T is the closure time.

E is the measure of the voltage of the radiated energy received at own craft.

Equation 1 may be derived, with reference to Fig. 1, in the following manner.

For radio signals in free space, the equations for power and voltage on the receiving antenna, at 0, are respectively:

$$\text{Power} = k'P = E^2 = \frac{k^2}{R^2} \qquad (2)$$

$$\text{Voltage} = E = \frac{k}{R} \qquad (3)$$

where $k$ is a constant, and R is the range to the radio signal transmitter.

Differentiation of (3) with respect to time gives:

$$\frac{dE}{dt}\frac{1}{E} = -\frac{dR}{dt}\frac{1}{R} \qquad (4)$$

From Fig. 1 it will be seen from the right triangle $A_1O_1P$ that $$S_rT = R \cos A_r \qquad (5)$$

and $$-\frac{dR}{dt} = S_r \cos A_r \qquad (6)$$

where $S_r$ is relative speed
R is range
$A_r$ is the angle between present range and relative speed or the angle between $O_1A_1P$
T is closure time.

Assuming that the transmitter for Equations 3 and 4 is located at A, then substitution of Equations 4 and 6 into Equation 5 yields $$\frac{1}{T} = \frac{dE}{dt} \frac{1}{E} \frac{1}{\cos^2 A_r} \qquad (7)$$

For the small angles of $A_r$ with which the problem is concerned $\cos^2 A_r = 1$ and, therefore, $$\frac{1}{T} = \frac{dE}{dt} \frac{1}{E} \qquad (8)$$

For larger values of $A_r$ the miss distance is considerable and safe passage is assured. From the identity $$\frac{d}{dt} \log_e E = \frac{dE}{dt} \frac{1}{E}$$

and equation 8

$$\frac{1}{T} = \frac{d}{dt} \log_e E \qquad (9)$$

It will be seen that the calibration constants of Equations 2 and 3 have vanished in the derivation. The accuracy of Equation 9 is, therefore, independent of slow changes in the power of the source, the sensitivity of the receiver, or the transmission medium. The only requirement is that $k$ must remain sufficiently constant during the differentiation time interval required for Equation 9.

Equation 9 states that the time-to-go to reach minimum range is equal to the reciprocal of the time rate of change of the natural logarithm of the voltage at the radio receiver antenna. One method of obtaining a signal proportional in magnitude to $\log_e E$ is to extract the automatic volume control signal from the radio receiver when A.V.C. is used. Other means may be employed when the A.V.C. signal is not available.

It should be understood that the preferred method here described for obtaining an indication of T is not the only method which can be employed. For example, one of the earlier methods having input of range and relative speed may be employed, if desired.

With the knowledge of closure time, the time rate of change of bearing is monitored. If a prescribed bearing change is not made good during preselected intervals of closure time, the pilot is alerted to possible danger of collision.

Thus, Fig. 1 illustrates a typical near-miss situation which represents a selected set of conditions to assure a safe passage. A bearing change of 2° has been arbitrarily chosen as the minimum acceptable in the following intervals of closure time:

| Initial Closure Time, seconds | Final Closure Time, seconds | Time Interval, seconds |
| --- | --- | --- |
| 75 | 50 | 25 |
| 50 | 37.5 | 12.5 |
| 37.5 | 30 | 7.5 |
| 30 | 25 | 5 |

When the closure time is less than twenty-five (25) seconds, a high bearing rate is not significant in predicting safe passage, since the bearing rate may be extremely high in unsafe conditions near closure. For example, in the case where two aircraft are approaching substantially head-on, and pass abeam of one another, the bearing rate at the instant of passing is infinite.

Other values of bearing change and time intervals may be chosen if desired. If at twenty-five (25) seconds-to-go the bearing change is less than 2°, some evasive action must be taken by the pilot to prevent collision.

Figure 3:
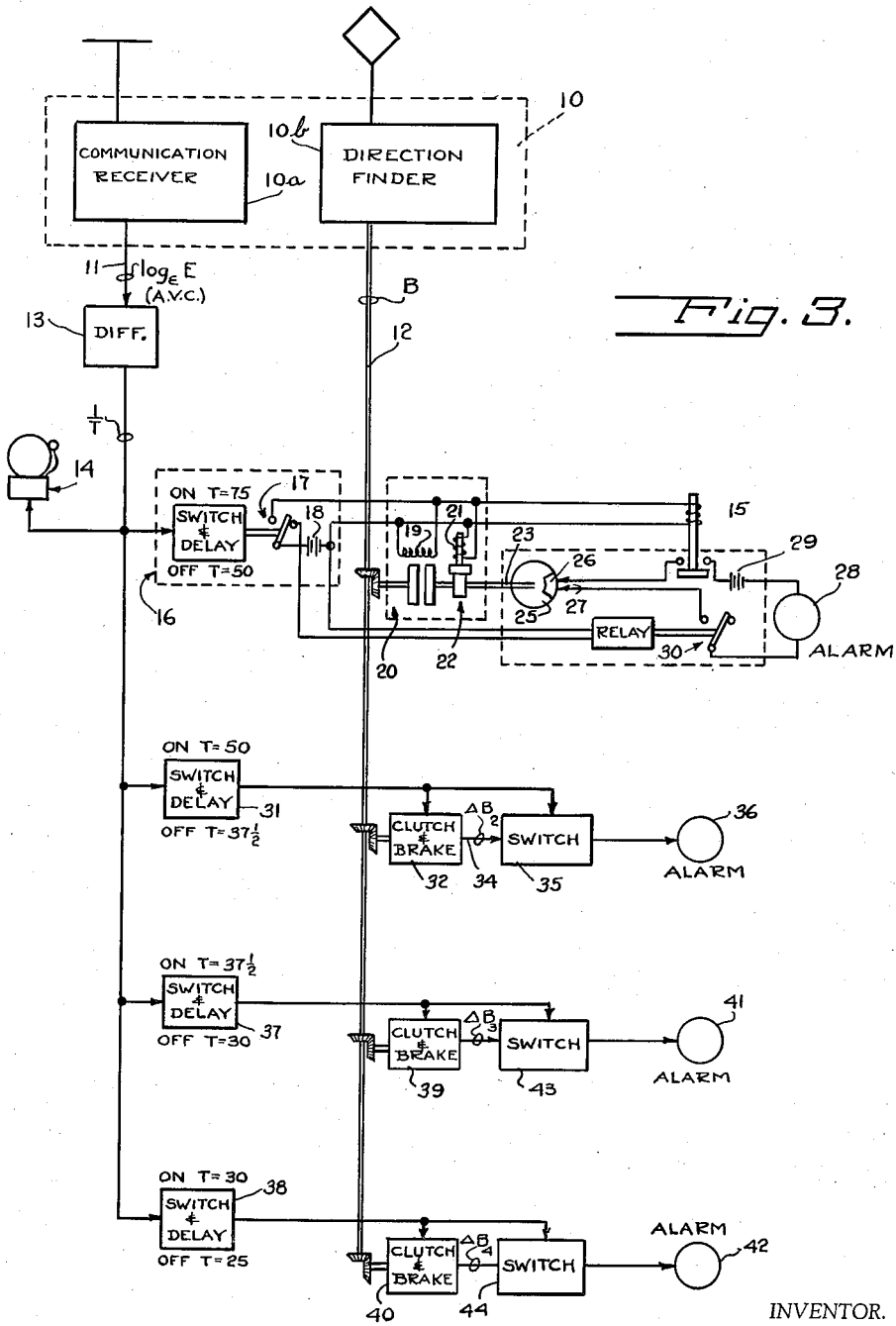
Fig. 3 represents a preferred embodiment of the system of Fig. 2.

Fig. 3 illustrates a proposed embodiment of the invention. In this figure, 10 represents the radio equipment carried by the aircraft which includes a communication receiver 10a and an automatic direction finder 10b, from which a signal proportional to the automatic volume control signal $E^1$ is available at bus 11 and a shaft displacement proportional to the relative bearing of the dangerous aircraft from own aircraft is available at shaft 12.

The direct current signal available at bus 11 is fed to the electrical differentiator 13 which may be simply a capacitor and resistor arrangement. Since the signal at bus 11 is proportional to $\log_e E$, the signal output of differentiator 13 is proportional to $$\frac{d}{dt} \log_e E \text{ or } \frac{1}{T}$$

Thus, as the the two aircraft A and O approach one another T decreases and the signal $$\frac{1}{T}$$

increases. As the voltage increases to that corresponding to seventy-five (75) seconds-to-go, an alarm 14 which is connected to the differentiator 13 is energized to provide a preliminary warning that closure time has decreased to a point where the intruding aircraft must be closely observed.

In the event that the signal at bus 11 is not proportional to $\log_e E$ to the degree of accuracy required for the present invention, a device, not shown, having a non-linear transfer characteristic may be interposed between the differentiator 13 and the bus 11 to provide the desired signal to the differentiator 13.

The signal output of differentiator 13 is applied also to electronic switch 16 which is adjusted so that it will actuate a relay operated time delay switch 17 when closure time is seventy-five (75) seconds. The time delay switch 17 remains closed for a period of twenty-five (25) seconds and then re-opens although the signal to switch 16 continues to rise. Switch 17 is connected in series with battery 18 and winding 19 of clutch 20 and winding 21 of brake 22 so that upon closure of switch 17, clutch 20 is engaged to connect shaft 12 to shaft 23 and the brake 22 is removed from shaft 23. At the end of twenty-five (25) seconds switch 17 opens to disengage clutch 20 and apply brake 22 to shaft 23.

The segment switch 24 includes an electrically insulating disc 25, in which a conducting segment 26 is embedded and a pair of contacts 27. The conducting segment 26 and the spacing of contacts 27 is chosen such that contacts 27 remain engaged through segment 26 as long as the displacement of shaft 23, which drives the contact disc 25, is less than 2°. The contacts 27 are connected in series with the alarm device 28, which may be a gong or a light, a reset switch 15 operated by switch 17, a power source 29 for the device 28 and a relay operated switch 30. The reset switch 15 is open prior to seventy-five (75) seconds-to-go, is closed at seventy-five (75) seconds-to-go as switch 30 is opened by switch 17 and remains closed after switch 17 is operated to the right upon completion of the twenty-five (25) second delay to prevent premature actuation of alarm 28. Switch 30 is closed when switch 17 is operated to the right in Fig. 2 to thereby complete the series circuit between contacts 27 and alarm 28 after closure time has decreased to fifty (50) seconds-to-go. If the shaft 23 has been driven less than 2° during the twenty-five (25) seconds that clutch 20 is engaged, contacts 27 are connected together and the alarm 28 is actuated. If shaft 23 has been driven more than 2°, the contacts 27 are not connected together and the alarm 28 is not actuated.

In a similar fashion, electronic switch 31 is operated for twelve and one half (12½) seconds at closure time of fifty (50) seconds, so that clutch 32 displaces the shaft 34 according to the bearing change during that twelve and one half (12½) seconds and, if the bearing change is less than 2° after the twelve and one half (12½) second interval is completed, the switch 35 operates alarm 36.

Similarly, switches 37 and 38, which operate at closure times of thirty-seven and one half (37½) and thirty (30) seconds for periods of seven and one half (7½) and five (5) seconds respectively, control the clutches 39 and 40 which, in turn, control the alarm devices 41 and 42 through switches 43 and 44 respectively. Thus, if the bearing change is less than 2° in the selected intervals of seven and one half (7½) and five (5) seconds, beginning at the times of thirty-seven and one half (37½) and thirty (30) seconds-to-go, the alarms 41 and 42 are operated to warn the pilot of imminent collision.

It should be realized that the schematic implementation of the invention shown in Fig. 3 is merely illustrative of one possible form which the invention may take and that innumerable embodiments can be constructed with an appropriate choice of elements. Basically, however, the alarm system is depicted in Fig. 2 and contemplates a device which is operated whenever the bearing change between the two aircraft is less than a predetermined amount during selected time intervals beginning at selected closure times.

I claim:

1. In a device of the character described, a signal receiver carried by own craft, a signal transmitter, said receiver producing a first signal indicative of the strength of the signal received from said transmitter, means actuated by said first signal to produce a second signal proportional to the time rate of change of the natural logarithm of the strength of the signal received, direction finding means for determining the bearing of said transmitter from said own craft, a plurality of means each actuated by said second signal and said direction finding means for determining the changes in bearing during selected time intervals beginning at predetermined values of said second signal, and alarm means responsive to the changes in bearing so determined.

2. In a device of the character described, means for obtaining a signal representative of closure time between an aircraft and an object, means for continuously determining the bearing of said object, means controlled by said signal for determining the actual bearing changes during preselected intervals of closure time beginning at preselected values of said signal, and alarm means controlled by said bearing changes.

3. In a device of the character described, means for obtaining a signal representative of closure time between an aircraft and an object, means for continuously determining the bearing of said object, means controlled by said signal for determining the actual bearing changes during preselected intervals of closure time beginning at preselected values of said signal, and alarm means controlled by said bearing changes, said alarm means being actuated for bearing changes less than a predetermined amount.

4. In a device of the character described, means for obtaining a signal representative of closure time between an aircraft and an object, means for continuously determining the bearing of said object, means controlled by said signal for determining the actual bearing changes during preselected intervals of closure time beginning at preselected values of said signal, and alarm means controlled by said bearing changes, said signal obtaining means including a radio receiver, means for producing an automatic volume control signal in said receiver and differentiator means energized by said control signal.

5. In a device of the character described, means for obtaining a signal representative of closure time between an aircraft and an object, means for continuously determining the bearing of said object, means controlled by said signal for determining the actual bearing changes during preselected intervals of closure time beginning at preselected values of said signal, and alarm means controlled by said bearing changes, said signal obtaining means including a radio receiver, means for producing an automatic volume control signal in said receiver and differentiator means energized by said control signal, said alarm means being actuated for bearing changes less than a predetermined amount.

6. In a device of the character described, means for obtaining a signal representative of closure time between an aircraft and an object, means for continuously determining the bearing of said object, means controlled by said signal for determining the actual bearing changes during preselected intervals of closure time beginning at preselected values of said signal, and alarm means controlled by said bearing changes, said signal obtaining means including a signal receiver producing a voltage having magnitude proportional to the strength of the signal received at said receiver, means energized by said voltage for producing a second voltage proportional to the natural logarithm of said magnitude, means for differentiating said second voltage with respect to time.

7. In a device of the character described, means for obtaining a signal representative of closure time between an aircraft and an object, means for continuously determining the bearing of said object, means controlled by said signal for determining the actual bearing changes during preselected intervals of closure time beginning at preselected values of said signal, and alarm means controlled by said bearing changes, said signal obtaining means including a signal receiver producing a voltage having magnitude proportional to the strength of the signal received at said receiver, means energized by said voltage for producing a second voltage proportional to the natural logarithm of said magnitude, means for differentiating said second voltage with respect to time, said alarm means being actuated for bearing changes less than a predetermined amount.

No references cited.